United States Patent [19]

Miyamoto et al.

[11] Patent Number: 5,109,901
[45] Date of Patent: May 5, 1992

[54] PNEUMATIC RADIAL TIRES HAVING A TREAD INCLUDING ISOLATED SIPES

[75] Inventors: Kenji Miyamoto, Kodaira; Makoto Tanaka, Higashimurayama; Norihiro Shimada, Kodaira, all of Japan

[73] Assignee: Bridgestone Corporation, Tokyo, Japan

[21] Appl. No.: 423,679

[22] Filed: Oct. 18, 1989

Related U.S. Application Data

[63] Continuation of Ser. No. 186,404, Apr. 26, 1988, abandoned.

[30] Foreign Application Priority Data

May 11, 1987 [JP] Japan .................. 62-115448

[51] Int. Cl.⁵ .................. B60C 11/06; B60C 11/12
[52] U.S. Cl. .................. 152/209 R; 152/DIG. 3
[58] Field of Search .......... 152/209 R, 209 D, DIG. 3

[56] References Cited

U.S. PATENT DOCUMENTS

| | | | |
|---|---|---|---|
| 2,094,636 | 10/1937 | Bull | 152/209 R |
| 2,261,025 | 10/1941 | Havens | 152/209 R |
| 3,332,465 | 7/1967 | French | 152/209 R |
| 4,945,966 | 8/1990 | Ogawa | 152/209 R |

FOREIGN PATENT DOCUMENTS

| | | | |
|---|---|---|---|
| 160541 | 11/1985 | European Pat. Off. | 152/DIG. 3 |
| 809470 | 3/1937 | France | 152/DIG. 3 |
| 61-35007 | 3/1986 | Japan . | |
| 61-235205 | 10/1986 | Japan . | |
| 522188 | 6/1940 | United Kingdom | 152/DIG. 3 |

*Primary Examiner*—Geoffrey L. Knable
*Attorney, Agent, or Firm*—Sughrue, Mion, Zinn, Macpeak & Seas

[57] ABSTRACT

A pneumatic radial tire comprises a tread divided into 4 to 5 ribs by 3 to 4 main wide grooves each extending circumferentially of the tire. In this tire, at least one row of sipes isolated from the main grooves in the axial direction of the tire and arranged at an approximately equal interval in the circumferential direction of the tire is arranged in only a second rib viewed from the outside in the axial direction of the tire.

14 Claims, 4 Drawing Sheets

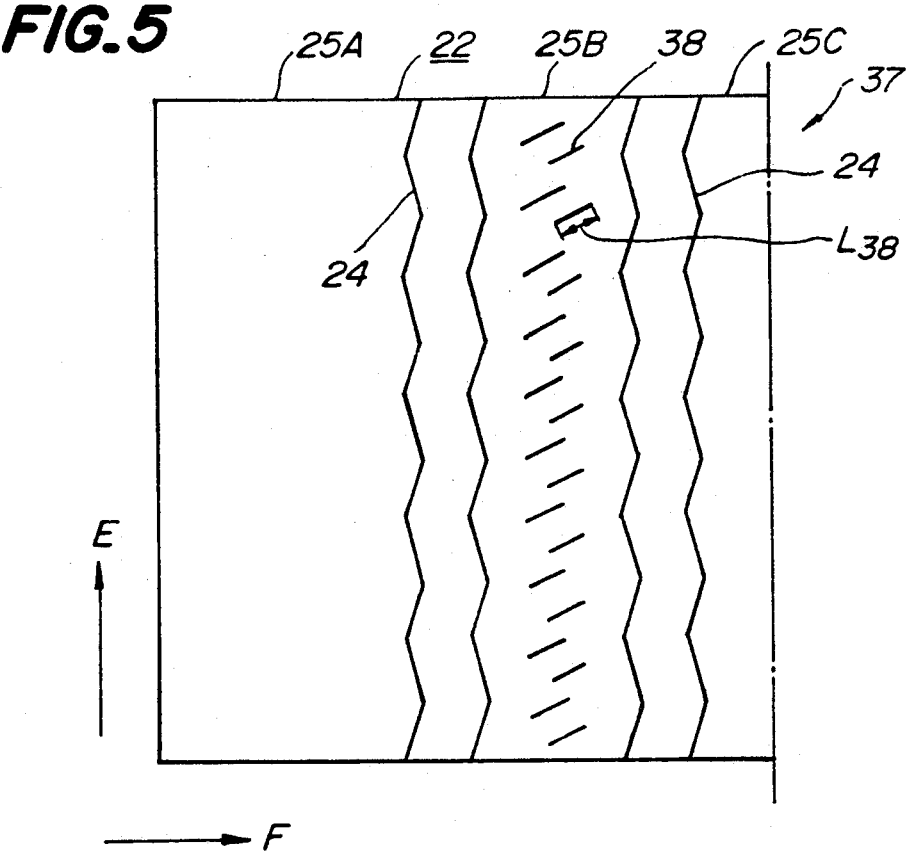
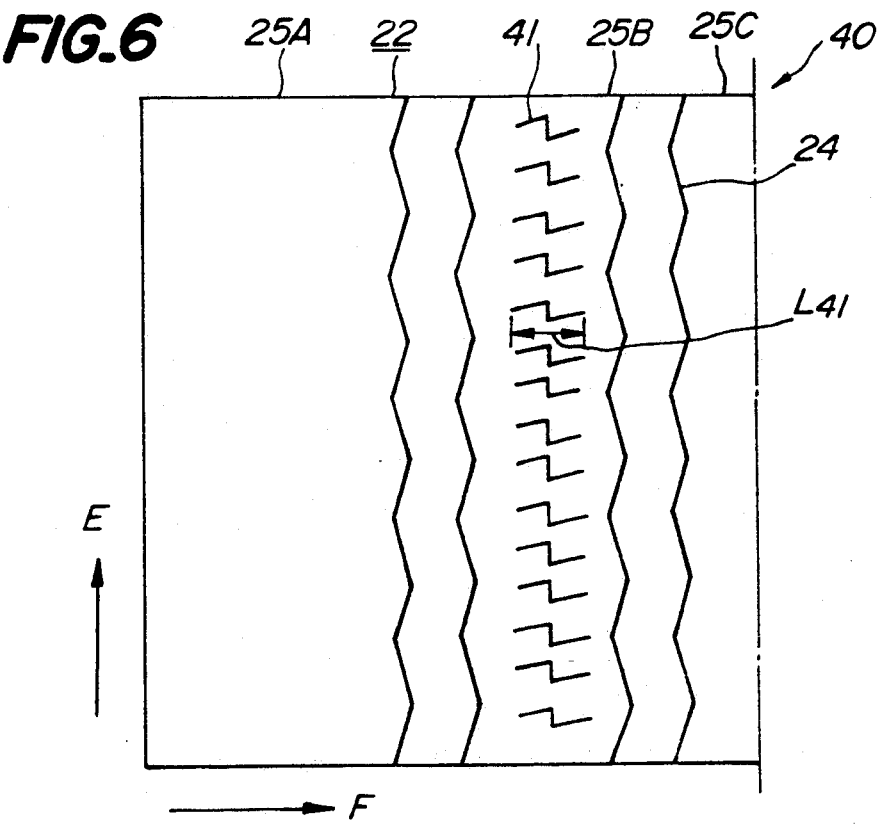

PNEUMATIC RADIAL TIRES HAVING A TREAD INCLUDING ISOLATED SIPES

This is a continuation of application Ser. No. 07/186,404 filed Apr. 26, 1988, now abandoned.

BACKGROUND OF THE INVENTION

1. Field of the Invention

This invention relates to pneumatic radial tires, and more particularly to an improvement in the prevention of uneven wear produced in low-section pneumatic radial tires to be mounted onto, for example, vehicles running on a good road at a high speed.

2. Related Art Statement

In general, as shown in FIGS. 7 and 8, (tire symmetrical about the circumferential line) low-section pneumatic radial tires 1 having a rib-type tread pattern have a drawback that when the tire is run on a good road at a high speed over a long period of time, uneven wear 6 (shadowed region in FIG. 7) in circumferential direction E or a so-called river wear is produced in a rib 5 defined by main grooves 3 extending in the circumferential direction E of tread 2. This is particularly the case in a outer end portion 5a of an inner rib 5A viewed from the outside edge of the tire.

In these conventional pneumatic radial tires, therefore, there have been proposed various attempts such as a reduction of amplitude in the circumferential rib 5, a change of shape in the main groove 3, arrangement of notch in the outer end portion 5a of the rib 5 and the like in order to solve the above problem. However, all of these attempts do not yet develop the desired effect. Inversely, the reduction of amplitude in the rib 5 brings about the degradation of wet resistant properties in the tire running on a wet road surface. That is, it is very difficult to simultaneously improve the wet performances and the resistance to uneven wear in the pneumatic radial tire.

SUMMARY OF THE INVENTION

It is, therefore, an object of the invention to provide a low-section pneumatic radial tire having a rib-type tread pattern which largely reduces the occurrence of uneven wear, particularly river wear produced in the tread rib.

The inventors have made various studies with respect to the ground contact form in high speed running, distribution of ground contact pressure, distribution of rigidity in tread rib, wear progressing state and the like in connection with the mechanism on the occurrence of river wear in the low-section pneumatic radial tire and confirmed the following facts.

As shown in FIG. 9, the tread footprint 12 of the low-section pneumatic radial tire 11 is apt to be rendered into a butterfly form at the ground contacting state. In this case, the ground contacting length La in the circumferential direction of an outer end portion 13a of a second rib 13A viewed from the outside is shorter than the ground contacting length Lb in circumferential direction of a central portion 13b of the rib 13A, so that the outer end portion 13a of the second rib 13A is movable and prematurely produces a nucleus for river wear through lateral force or the like applied in the turning. Furthermore, the ground contact pressure Pa and rigidity Sa of the outer end portion 13a of the rib 13A are smaller than the ground contact pressure Pb and rigidity Sb of the central portion 13b of the rib 13A.

Thus, the outer end portion 13a of the rib 13A is apt to move during running and only a part of the outer end portion 13a of the rib 13A is locally and prematurely worn to form a stepped segment 13c to the central portion 13b. As a result, the outer end portion 13a having low rigidity and ground contact pressure is largely slipped on road surface through a dragging action based on the difference in rotational diameter between the portion producing the stepped segment 13c as a nucleus for uneven wear and the remaining main portion of the tread, whereby the wearing is enlargedly progressed in the circumferential direction E and axial direction F to finally develop uneven wear. Thus, the mechanism on the occurrence of uneven wear has been elucidated.

The inventors have made further studies with respect to causes for the premature occurrence of stepped segment 13c as a nucleus for uneven wear and the progress of the stepped segment 13c. They have found that the progress of the wearing nucleus can largely be reduced by lowering the rigidity Sb of the central portion 13b of the rib 13A and properly balancing the rigidity Sb with the rigidity Sa of the outer end portion 13a of the rib 13A, and as a result the invention has been accomplished.

According to the invention, there is the provision of a pneumatic radial tire comprising a tread divided into 4 to 5 ribs by 3 to 4 main wide grooves each extending circumferentially of the tire, characterized in that at least one row of sipes isolated from said main grooves while substantially extending in the axial direction of the tire and arranged at an approximately equal interval in the circumferential direction of the tire is arranged in only a second rib counted from the outside edge of the tire in the axial direction thereof of the tire.

In a preferred embodiment of the invention, the sipe is desirable to have a projection length in the axial direction of the tire corresponding to 10~70% of the rib width and a depth corresponding to 30~100% of the depth of the outermost main groove. Furthermore, the interval between the sipes is within a range of 3~20 mm, preferably 5~15 mm. When the interval exceeds 20 mm, the effect aiming at the invention is small, while when it is less than 3 mm, the rubber fracture and the chipping phenomenon undesirably occur.

Moreover, the width of the sipe is within a range of 0.1~0.7 mm, preferably 0.1~0.5 mm. When the width exceeds 0.7 mm, the effect aiming at the invention lowers.

And also, the inclination angle of the sipe with respect to the axial direction of the tire is within a range of 0°~30°, preferably 0°~20°. When the inclination angle exceeds 30°, the effect aiming at the invention lowers.

In the pneumatic radial tire according to the invention, many sipes isolated from the main grooves while extending in the axial direction of the tire are arranged in the second rib viewed from the outside of the tire. The rigidity of the central portion of the second rib is reduced as compared with the rigidity of the outer end portion of the second rib and the balance of rigidity between the outer end portion and the central portion in the rib is made adequate. Therefore, the lateral force in the turning and the dragging action at the wearing nucleus in the straight running are largely reduced to considerably reduce the progress of wear in the circumferential direction and the axial direction of the tire.

BRIEF DESCRIPTION OF THE DRAWINGS

FIGS. 3 to 6 are partial plan views of the other embodiments of the pneumatic radial tire according to the invention, respectively;

DESCRIPTION OF THE PREFERRED EMBODIMENTS

Figure 1:
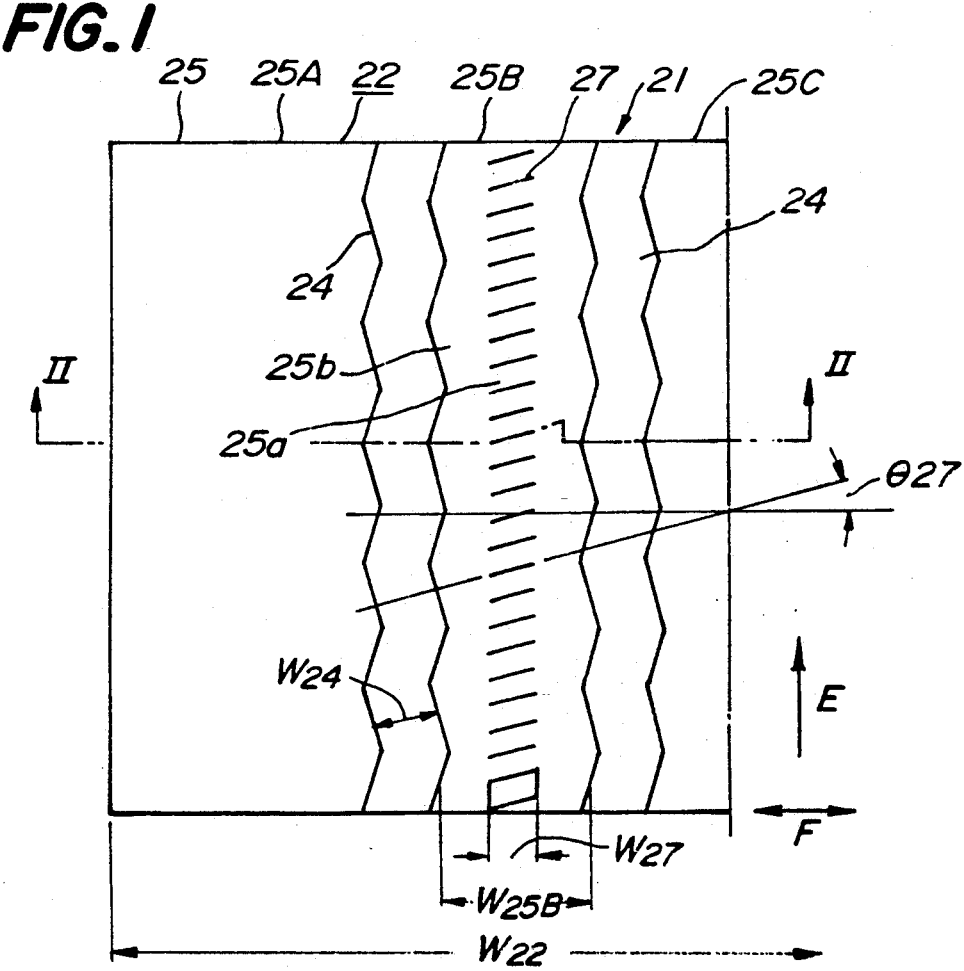
FIG. 1 is a partial plan view of a first embodiment of the pneumatic radial tire according to the invention.
Figure 2:
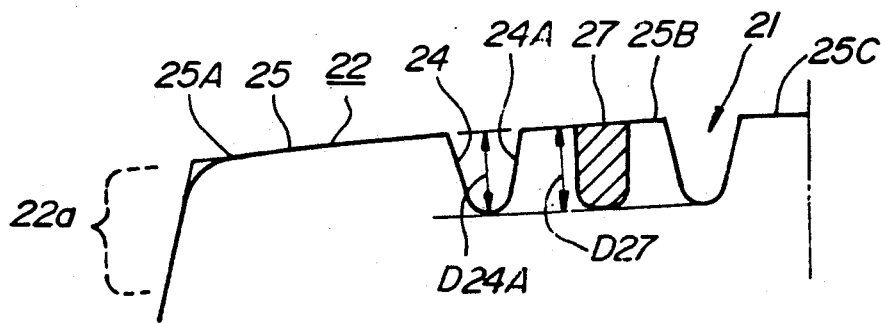
FIG. 2 is a schematically sectional view taken along a line II—II of FIG. 1.

In FIGS. 1 and 2 is shown a first embodiment of the pneumatic radial tire according to the invention.

As shown in FIGS. 1 and 2, the pneumatic radial tire 21 has a tire size of 13.50/80 R16 and comprises a surface portion 22a of a tread 22 divided into five ribs 25 by four main wide grooves 24 extending zigzag in the circumferential direction E of the tire. The ribs 25, comprise a first outermost rib 25A viewed inward from the axial direction F of the tire, a second rib 25B viewed from the outside of the tire and a central rib 25C in FIGS. 1 and 2. The tire is symmetrical about the circumferential line. The width $W_{24}$ of the main groove 24 in the illustrated embodiment is about 5% of the tread width $W_{22}$ of the tread 22. According to the invention, the width $W_{24}$ is within a range of 2~10%, preferably 3~8% of the tread width $W_{22}$. In the second rib 25B of the tread 22 viewed inward from the axial direction F of the tire is arranged a row of sipes 27 isolated from the main grooves 24 while extending in the central portion 25a of the second rib 25B toward the axial direction F and arranged at an approximately equal interval (8.7 mm in the illustrated embodiment) in the circumferential direction E of the tire. The inclination angle $\theta_{27}$ of the sipe 27 with respect to the axial direction is 15° and also the projection length $W_{27}$ of the sipe 27 in the axial direction F of the tire is 33% of the rib width $W_{25B}$ of the second rib 25B. Furthermore, the depth $D_{27}$ of the sipe 27 is equal to the depth $D_{24A}$ of the outermost main groove 24A in the tread 22. Moreover, the width of the sipe 27 is 0.4 mm. Thus, the opposed wall faces of the sipe 27 are closed to each other in turning and straight running to develop the drainage effect.

The construction of the tire other than the above structure is the same as in the radial tire usually used, so that the detail thereof is omitted.

The function of the above tire will be described below.

In the pneumatic radial tire 21 according to the invention, a row of sipes 27 extending in the axial direction F of the tire is arranged in the substantially central portion 25b of the second rib 25B at an equal interval between sipes (8.7 mm) in the circumferential direction E of the tire over a whole periphery of the tire. The sipe 27 has a projection length $W_{27}$ in the axial direction corresponding to 33% of the rib width $W_{25B}$ of the second rib 25B and a depth $D_{27}$ equal to the depth $D_{24A}$ of the main groove 24A and the width $W_{24}$ of the main groove 24A is 12 mm (5.6%). Thus, the rigidity of the central portion 25a of the second rib 25B is largely reduced. Therefore, even when dragging through the lateral force in the turning and the diameter difference in the widthwise direction during the straight running is produced in the tread 22, the slipping of an outer end portion 25b of the second rib 25B is mitigated by slipping the central portion 25a of the second rib 25B. As a result, the wearing amount of the outer end portion 25b of the second rib 25B becomes less to largely suppress the occurrence of the river wear.

Next, the second to fifth embodiments of the pneumatic radial tire according to the invention will be described with reference to FIGS. 3 to 6. These treads are also symmetrical about the circumferential mid-line.

The second to fifth embodiments show cases of variously changing the length, direction, shape, arrangement and the like of the sipe shown in FIG. 1, respectively, wherein the same part as in FIG. 1 is represented by the same numeral.

Figure 3:
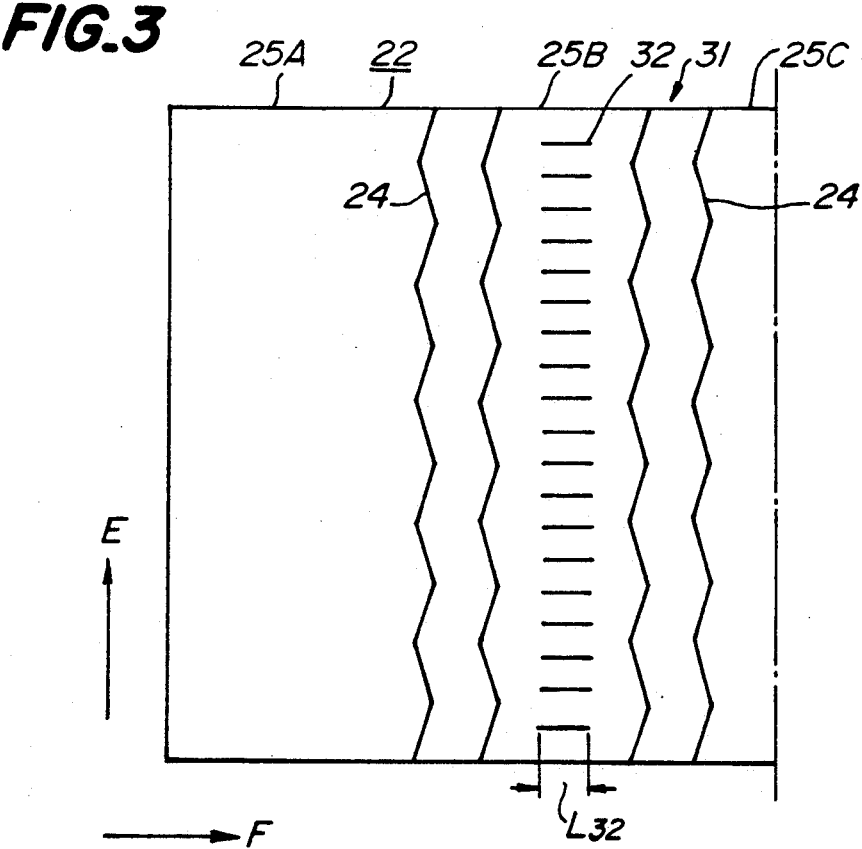

In the tire 31, a second embodiment illustrated in FIG. 3, plural sipes 32 have the same length $L_{32}$ in the axial direction F and arranged at an equal interval in the circumferential direction E in a row so as to locate both ends of the sipes 32 on same lines in the circumferential direction E.

Figure 4:
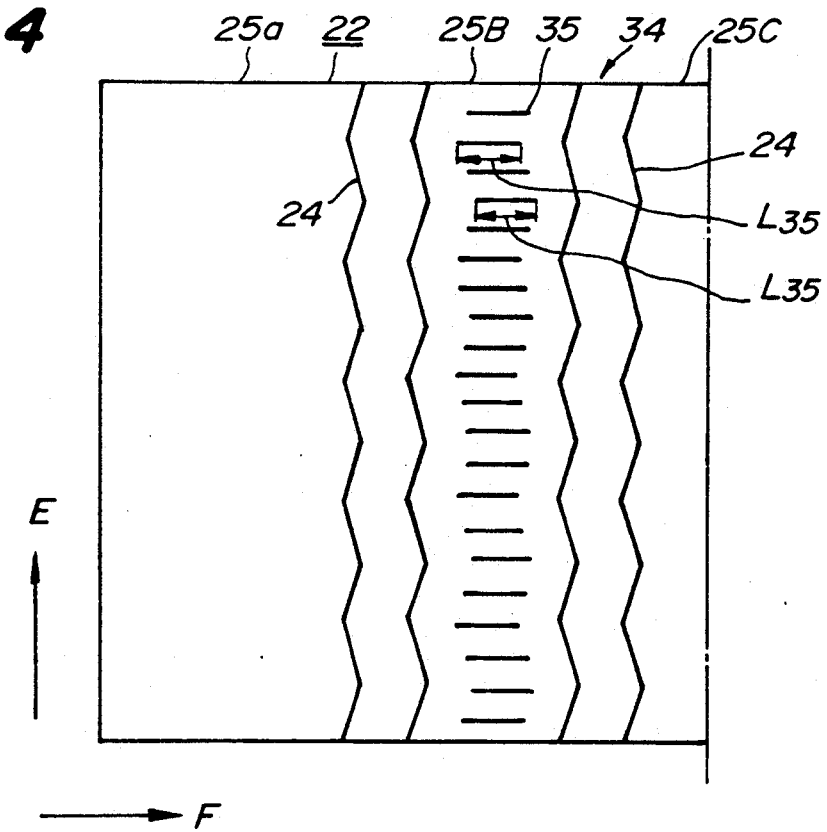
Figure 7:
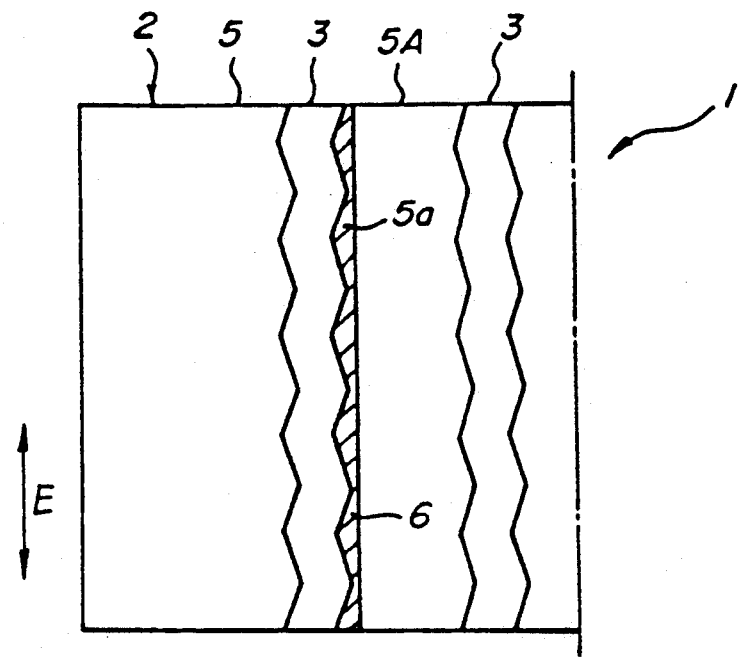
FIG. 7 is a partial plan view of the conventional pneumatic radial tire.
Figure 8:
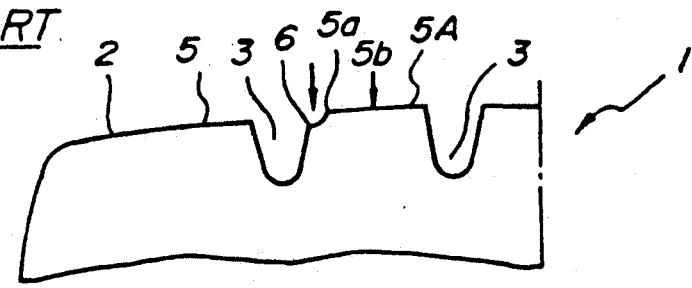
FIG. 8 is a partially sectional view of the tire shown in FIG. 7.
Figure 9:
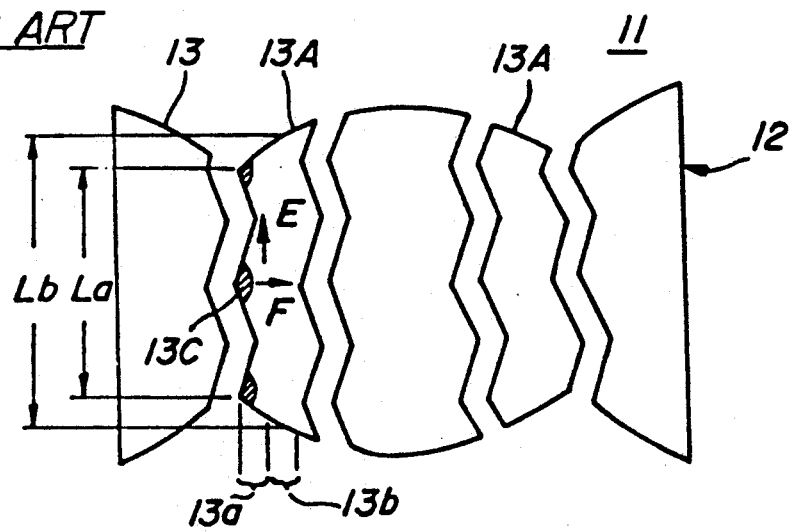
FIG. 9 is a diagrammatic view illustrating the behavior of the tire shown in FIG. 7 at ground contacting state.

In the tire 34, a third embodiment illustrated in FIG. 4, plural sipes 35 have an equal length $L_{35}$ in the axial direction F and arranged at an equal interval in the circumferential direction E in a row so as to slightly shift both ends of the sipes from each other in the axial direction F.

In the tire 37, a fourth embodiment illustrated in FIG. 5, plural sipes 38 are inclined at an angle of 30° with respect to the axial direction F, have an equal length $L_{38}$, and are arranged at an equal interval in the circumferential direction E in a row so as to slightly shift both ends of the sipes from each other in the axial direction F.

In the tire 40, a fifth embodiment illustrated in FIG. 6, each of plural sipes 41 is rendered into a zigzag form in the axial direction F, and has an equal length $L_{41}$, and is arranged at an equal interval in the circumferential direction E in a row so as to locate both ends of the sipes on same lines in the circumferential direction E.

Although the above embodiments have been described with respect to the case of changing length, direction, shape, arrangement and the like of the sipe, the invention is not intended to limitations thereof. That is, the width and depth of the sipe as well as the number of sipe rows may be changed for changing the rigidity of the central portion of the second rib 25B.

The effect of the invention will be described with reference to the following test.

In this test, there were provided two test tires A and B (tire size: 13.50/80 R16), wherein the tire A was the same as in the first embodiment of FIGS. 1 and 2 and the tire B (comparative example) was the conventional tire having the same construction as in the tire A except the removal of the sipe 27.

Each of these test tires was mounted onto an ordinary test vehicle and run on actual road surface over a distance of 68,000 km, and thereafter the state of generating river wear was measured. As a result, it was observed that river wear having a width of 10~15 mm and a stepped difference between outer end portion and central portion of 2~3 mm was produced in the second rib of the test tire B. On the other hand, the degree of river wear produced in the test tire A according to the invention had a width of 5~7 mm and a stepped difference of 0.5~1.0 mm. That is, in the tire according to the invention, the occurrence of rive wear was largely prevented as compared with the case of the conventional tire and the wear life of the tire was considerably increased.

As mentioned above, according to the invention, the occurrence of uneven wear, particularly river wear produced in the rib of the low-section pneumatic radial tire having a rib-type tread pattern can largely be reduced to considerably increase the wear life of the tire.

What is claimed is:

1. A pneumatic radial tire comprising: a tread divided into 5 ribs by 4 main wide grooves each extending circumferentially of the tire, wherein at least one row of sipes isolated from said main grooves and extending at an inclination angle of 0°-30° to the axial direction of the tire are arranged at an approximately equal interval in the circumferential direction of the tire on each side of the tire divided by a circumferential mid-line in only a second rib viewed inward from the outside edge in the axial direction of the tire and no other ribs have a pattern of sipes.

2. The pneumatic radial tire according to claim 1, wherein said sipe has a projection length in the axial direction of the tire corresponding to 10~70% of the rib width.

3. The pneumatic radial tire according to claim 1, wherein said sipe has a depth corresponding to 30~100% of the depth of the outermost main groove.

4. The pneumatic radial tire according to claim 1, wherein said sipes are arranged at an interval of 3~20 mm in the circumferential direction of the tire.

5. The pneumatic radial tire according to claim 4, wherein said interval is 5~15 mm.

6. The pneumatic radial tire according to claim 1, wherein said sipe has a width of 0.1~0.7 mm.

7. The pneumatic radial tire according to claim 6, wherein said width is 0.1~0.5 mm.

8. The pneumatic radial tire according to claim 1, wherein said sipe has an inclination angle of substantially 0° with respect to the axial direction of the tire.

9. The pneumatic radial tire according to claim 1, wherein said inclination angle is 0°~20°.

10. The pneumatic radial tire according to claim 1 wherein said second rib on each side of the tire has, in a central portion thereof, a rigidity less than in outer portions due to said sipes which are isolated from said main grooves.

11. The pneumatic radial tire according to claim 1 wherein said sipes are all parallel to each other.

12. The pneumatic radial tire according to claim 11 wherein said sipes are all parallel to the tire axial direction.

13. The pneumatic radial tire according to claim 12 wherein adjacent sipes are axially shifted relative to each other.

14. The pneumatic radial tire according to claim 1 wherein said sipes are a zig-zag pattern with said sipes symmetrical to each other.

* * * * *